INVENTOR
HARRY PETROHILOS

United States Patent Office 3,441,846
Patented Apr. 29, 1969

3,441,846
DIGITAL READOUT INSTRUMENT EMPLOYING A NON-LINEAR TRANSDUCER AND A LINEAR POTENTIOMETER
Harry Petrohilos, Yellow Springs, Ohio, assignor to United Systems Corporation, Dayton, Ohio, a corporation of Ohio
Filed Nov. 16, 1964, Ser. No. 411,230
Int. Cl. G01r 17/06, 27/02
U.S. Cl. 324—65     5 Claims

ABSTRACT OF THE DISCLOSURE

A digital reading meter which employs a non-linear transducer for measuring an unknown parameter as one arm in a null-seeking bridge circuit. Another arm of the bridge is formed by a function shaping network comprising a series of resistances closely approximating the resistance vs. parameter characteristic of the transducer and employing a linear potentiometer to different taps of which the resistances are connected. The unbalance in the bridge caused by the transducer arm variance is detected by a servo amplifier which operates through a servo motor and the linear potentiometer to change the ratio of the fixed resistance bridge arms to rebalance the bridge and also drive a turns counter to indicate a digital representation of the parameter. A fixed resistor is connected in series with the bridge and is so selected as to minimize variations in the rebalancing signal with respect to incremental changes of values of said parameter.

---

This invention relates to an instrument for accurately measuring and digitally displaying temperature values.

Meters which have been employed for measuring parameters such as temperature values, pressures, etc. of the moving pointer type have the shortcoming that if it is desired to cover a wide range either an undesireably long scale or multiple scales must be provided. In the latter case the operator has to switch from range to range until he finds the approximate range, and then the meter will indicate a small increment which reading is subject to human error because of interpretation of pointer position. It is therefore highly desirable to provide digitally reading meters for temperature measurement purposes since a wide range can be covered with a high degree of accuracy and high resolution.

It is one object of the invention to provide an instrument employing an electrical transducer for temperature measurement and a means for presenting the temperature value in digital form. It is a further object of the invention to provide an instrument which digitally displays temperature values and employs a temperature probe containing a thermistor or other temperature variable resistor. A still further object of the invention is to provide a digital meter employing non-linear temperature transducers yet directly and digitally reading out temperature values. Another object of the invention is to provide a digitally reading meter capable of measuring any variable for which a similarly sensitive resistor is available. These and further objects of the invention will become more readily apparent from a reading of the description following hereinafter, and from an examination of the drawings, in which:

The instrument of the invention employs a null-seeking Wheatstone bridge circuit. One of the resistance arms of the bridge is sensitive to the parameter to be measured, such as temperature. When the parameter varies, the resistance of this transducer arm also varies to cause an unbalance of the bridge, this unbalance is detected by a servo amplifier such as is described in the co-pending application of Bernard Fisher, Ser. No. 290,020, filed June 24, 1963, and entitled Digital Meter. The servo amplifier operates to change the ratio of the bridge arms to rebalance the bridge, i.e. the ratio of the fixed resistances, and at the same time drives a counter to measure the number of turns it takes to rebalance the bridge. The bridge is rebalanced by means of a potentiometer circuit which is mechanically coupled to a turns counter. Thus for a particular value of the parameter there is a particular point on the rotation of the counter that corresponds thereto. Further description of the invention will be made with reference to temperature as the parameter being measured, although it is to be understood that, as indicated above, other parameters to which a resistance is sensitive can be similarly measured.

If the potentiometer is made non-linear so as to follow the temperature resistance characteristic of the sensor or transducer then the counter will read out temperature directly, providing of course that the gearing interconnecting the pot with the counter has a proper ratio corresponding to the desired temperature span. It is realized that where thermistors are employed, the resistance of the thermistor changes very greatly with temperature changes. A bridge employing a thermistor will not have a constant sensitivity because for a given increment of temperature change there will not be a uniform increment of error signal created by the bridge with which to drive the servo. The invention contemplates providing a function network in the bridge that minimizes this effect and closely approximates the resistance vs. temperature characteristic of the thermistor or other temperature sensitive resistance, thereby obtaining a non-linear function out of a linear potentiometer. If this were not done then special function potentiometers, a relatively expensive item, would have to be employed in the bridge. By practicing the teaching of the invention a relatively economical linear potentiometer can be employed. In this manner I have found that whereas ordinarily it would be expected that the ratio of the temperature increment to the incremental error signal created by the bridge would be in order of 100:1, by employing the teaching of the invention the ratio may be reduced to only about 2.5:1.

Figure 1:
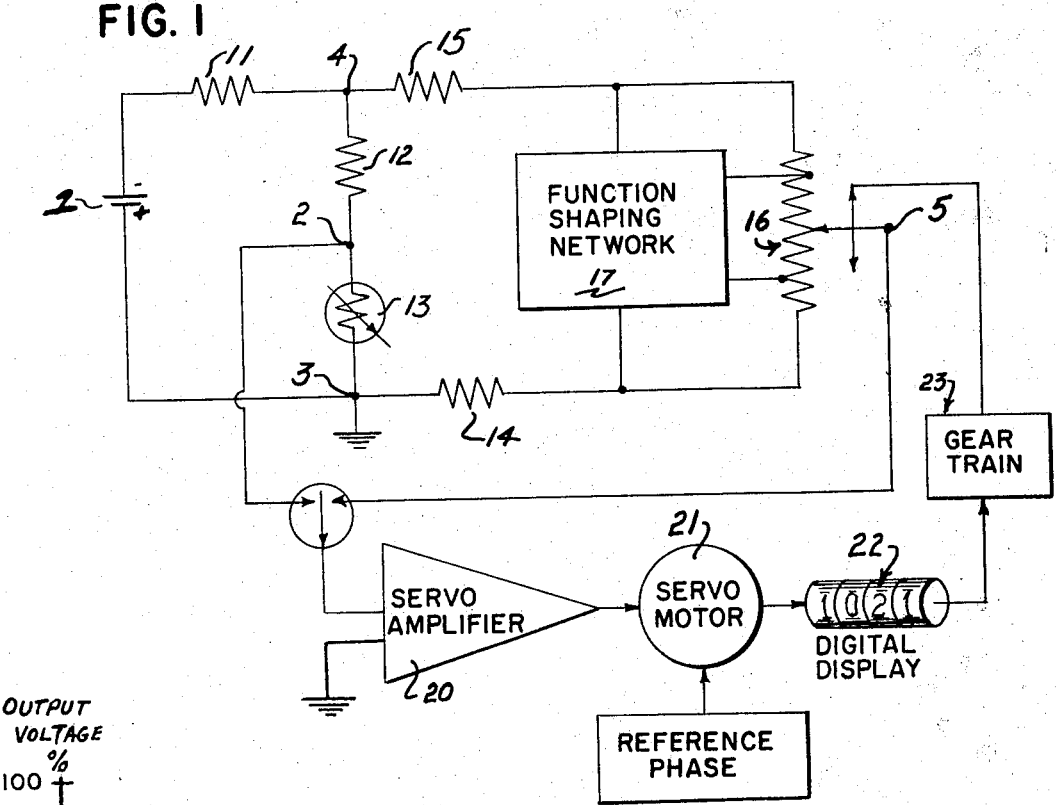
FIG. 1 is a block diagram and schematic representation of the digital meter of the invention.

Referring now to FIG. 1 it is seen that the servo amplifier 20, the servo motor 21, the digital display 22 and the gear train comprise those elements which are more clearly disclosed and claimed in the aforesaid copending application Ser. No. 290,020. The bridge includes the thermistor 13 and resistance 12 as one side of the bridge and the resistances 14 and 15 as the other side of the bridge. Both sides of the bridge have a common ground at 3, and an output at 2 which is proportional to temperature. Another output at 5 is proportional to the position of the potentiometer 16, and also is proportional to the position of the digital display 22, since the latter is coupled to the pot by the gear train 23 and associated mechanical coupling. 1 is a voltage source for both sides of the bridge. The output of 1 at point 2 is a non-linear function of the temperature, i.e. at low temperatures the output is a very high value of voltage. As the temperature increases the output at 2 will also increase if the sensor is the positive temperature coefficient type of transducer; or it can decrease if the sensor is a negative temperature coefficient type of transducer. Thus, the output at 2 varies in a non-linear fashion depending on the characteristic of the temperature transducer 13.

Figure 3:
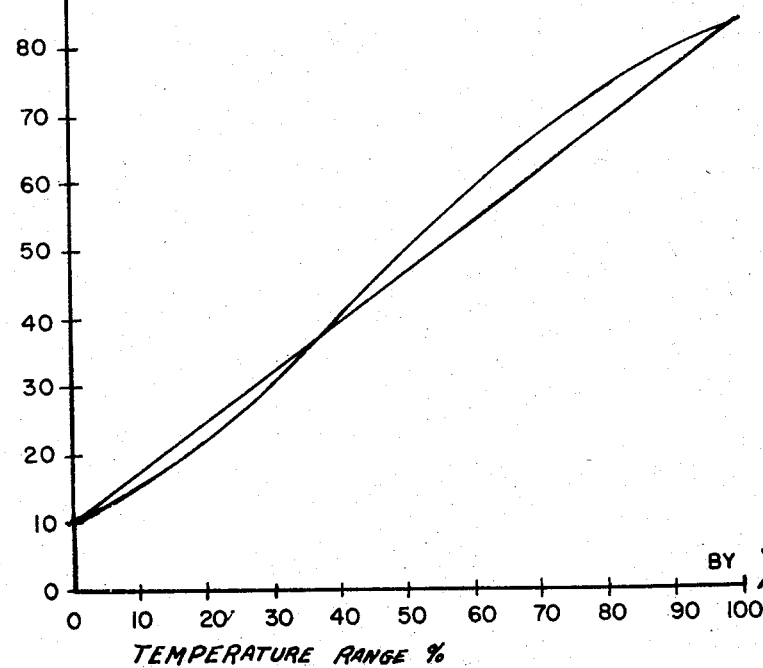
FIG. 3 is a graph of voltage vs. temperature expressed in percent of the range encountered.

The value of the resistor 12 determines the shape of the curve plotted as voltage at point 2 vs. temperature (see FIG. 3). If the resistance of 12 is equal to the resistance of 13 at a given temperature then the voltage at 2 would be ½ the voltage from junction 3 to junction 4, at that temperature. Therefore at other temperature values it will be some other value of voltage. It is thus possible by properly choosing the value of the resistance 12 with respect to the resistance of the transducer 13, to make the voltage at 2 approach an S-type of curve with equal and slight deviations from linearity as shown in FIG. 3. This will result in the maximum linearity which can be attained using standard components. The invention provides means, described presently, which insure that the voltage output at 5 exactly follows this same curve. Thus the temperature position of the pot 16 will be made corresponding to the unknown temperature sensed at the thermistor 13, and hence the temperature reading at 22 will also correspond to the unknown temperature sensed.

The difference between the voltage at 2 and the voltage at 5 is measured by the chopper comparator 24 (whose functional operation with respect to the servo amplifier 20, etc. is more clearly explained in the aforementioned application Ser. No. 290,020). The chopper comparator produces a signal which is transmitted to the servo motor 21 by the amplifier 20 in order to drive the potentiometer 16 to such position that the bridge is rebalanced, i.e. the voltage difference between points 2 and 5 is zero. Due to the presence of the function shaping network 17, a linear reading is obtained at the display 22 even though the potentiometer is a linear device and the response at 2 is non-linear.

The resistances 14 and 15 are so selected as to establish the end points of the temperature range of the instrument. Their resistance value is so chosen with respect to the potentiometer that at one end position of the pot the resistance 14, for example, is adjusted so that the display 22 indicates the low temperature end point; and at the other end position of the pot the resistance 15 will be adjusted so that the display 22 indicates the high temperature end point.

It is known that a thermistor changes greatly in resistance over a temperature range so that it will vary the overall impedance of the bridge. The resistance 11 and the composite resistance of the bridge can therefore be considered as two resistances in a divider network, and the voltage at the junction of them, i.e. at 4, will vary with respect to temperature. Since thermistors have a high sensitivity and high resistance at low temperatures (i.e. if they are the negative type of temperature coefficient transducer), the value of 11 can be so chosen that at low temperature a high voltage appears at 4. It is also desirable to choose the resistance 12 of such value as to aproximate the value of resistance of the thermistor at the middle of the temperature range. In this manner the inherent variations in the error signal with respect to temperature change will be minimized, and the optimum error signal per temperature increment will be obtained from the network 11, 12, 13.

For purposes of the discussion that hereinafter follows, the network 11, 12, 13 will be referred to as the temperature sensing part of the bridge, and the remainder of the bridge can be referred to as the function shaping part of the bridge. As indicated previously there are two ways in which the function of the potentiometer can be caused to change. One obvious method is to employ a specially designed function potentiometer with each thermistor which has been designed to follow the curve of voltage vs. temperature (FIG. 3) for that thermistor 13. Such function pots are not economical. The second method is to connect a means such as the novel function shaping network of the invention to taps on the potentiometer. The network serves to produce a voltage output that is related to the position of the pot. The function shaping network in the instant invention comprises a series of fixed resistances external to the pot but connected to different taps on the pot. The tap points are determined as those places where the curve changes direction. The output of the pot is thus made to approach the required function by means of straight line approximations to the desired S-curve. Obivously as the temperature range desired to be measured by the instrument becomes larger the number of fixed resistances required to obtain the S-curve approximation will reach an undesirably large number so that eventually it may be more economical to employ a function potentiometer.

As indicated above, my invention employs a position or null seeking and rebalancing bridge instead of a bridge having an output voltage which would be converted into a temperature value by means of a non-linear pot. In the latter case the voltage reference 1 would have to be very accurate. By using the bridge balancing technique the voltage source 1 need not be accurate nor need it stay stable since it affects the error signal only and not the ratio of the resistances in the bridge. The ratio, and therefore the temperature reading is dependent primarily upon the resistance values of the bridge, for which precision resistors can readily and economically be obtained.

Figure 2:
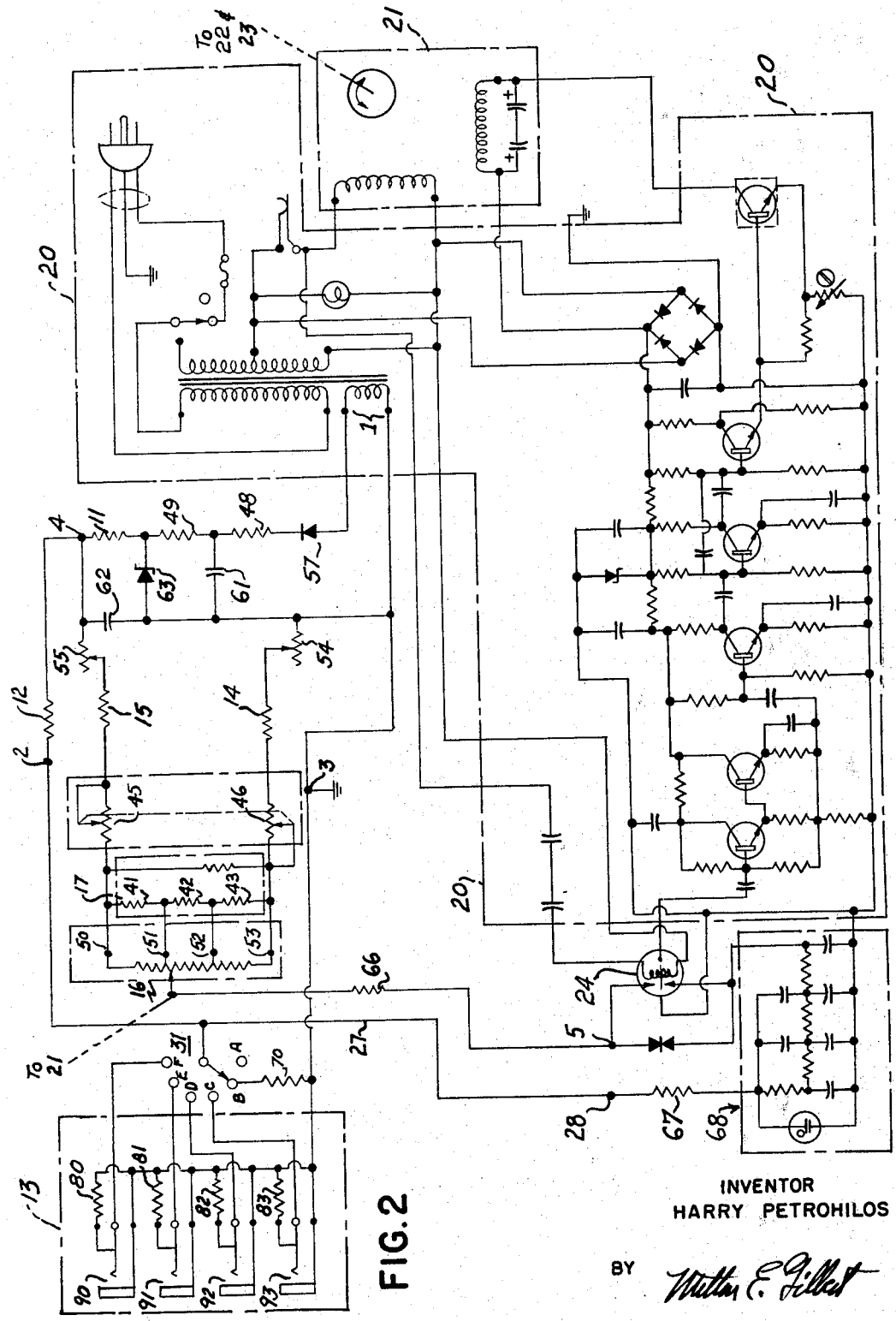
FIG. 2 is an electrical wiring diagram of the digital meter of the invention.

Referring now to FIG. 2, and comparing this schematic with that shown in FIG. 2 of the aforementioned application Ser. No. 290,020 it is seen that the chopper comparator 24, servo amplifier 20 and servo motor 21 are shown which compare exactly in function with the equivalent components shown and described in said aforementioned application.

The bridge power supply is tapped off of the power supply for the servo amplifier at 1. The temperature sensing part of the bridge includes the resistances 11 and 12 together with the temperature probe or thermistor 13 which is shown as a plurality of jacks into which any of four temperature probes can be placed to scan from one to four temperature points with the same instrument. The temperature sensitive output of the bridge appears at the junction 2, and is applied over line 27 to one side 28 of the chopper comparator 24. The other side of the chopper is supplied by the potentiometer 16 output at junction 5. As indicated in FIG. 2 the movable arm of the potentiometer 16 is mechanically coupled so as to be driven by the servo motor 21.

The potentiometer 16 shown in FIG. 2 is a linear pot which is made non-linear by the series of fixed resistances 41, 42 and 43 which are connected to the taps 50, 51, 52 and 53 of the pot 16 as shown to form a function shaping network.

The two end points of the temperature range are preset by the resistance networks 14, 54 and 15, 55, the resistances 54 and 55 being adjustable for calibration purposes. Resistors 45 and 46 are indicated as being a dual ganged potentiometer which enables shifting of the range of the instrument up or down in temperature by a fixed quantity, so that any small effects due to noise, etc. that may be introduced in the instrument can be cancelled out.

In operation the instrument is first calibrated by operating the switch 31 to the position B as shown in FIG. 2. In this position the temperature transducers 13 are eliminated from the circuit, and a known very precisely selected resistance 70 is inserted in its place. Although a single resistance 70 is shown it is obvious that a decade resistance box or other multiple or adjustable resistance can be used. The resistance 70 is selected to correspond to a known temperature which is included in the span of temperatures to be measured by the instrument. The equivalent temperature is digitally displayed on the front panel of the instrument by the digital display or readout 22. If the proper temperature is not displayed then the resistances 45 and 46 are adjusted until the proper reading is obtained.

Next the temperature probes are inserted into one or more of the jacks 13 and the proper switch position C, D, E, or F is selected at switch 31. The voltage then obtained at the potentiometer 16 is presented at junction 5 of the chopper comparator and the voltage appearing at junction 2 is fed to junction 28 of the comparator 24. The error or difference signal obtained is appropriately amplified and applied to drive the servo motor 21, which in turn not only drives the digital display and the gear train, but also drives the movable element of the pot 16. This adjustment or balancing of the pot continues until no signal difference is found by the comparator 24, at which time the digital display will read the exact temperature being sensed by the thermistor probes 13.

Resistance 66 is placed between the potentiometer output and the chopper input to protect the input to the amplifier from large voltage differences between the two sides of the bridge. The resistance 67 serves a similar function and also leads to a noise filter network 68.

As indicated, the bridge receives its power supply at 1 from the amplifier power supply, which is an AC signal. This signal is rectified by a simple half-wave rectifier 57, which also is provided with a filter network consisting of resistance 48 and capacitor 61, which provides first order filtering of the now pulsating DC. Resistance 49 is employed as a dropping resistance to lower the voltage at the junction of the resistances 48 and 49 to the level of the Zener diode 63. This serves the purpose of further filtering and regulating the voltage so that no line transients appear at the output of the Zener diode 63. Capacitor 62 is employed to further remove any remaining trace of AC hum or ripple that may be coming from the power supply, so that what is applied across the bridge junctions 3 and 4 is very pure DC, with no other error signal being presented to the amplifier other than the temperature, and the position of the slider of the potentiometer.

The thermistors 13 include a series of dummy resistors 80, 81, 82 and 83 which cooperate with their respective jacks 90, 91, 92 and 93 so that when the transducer probe is removed from the jack, the respective dummy resistor at the base of the probe is thrown into the circuit to protect the bridge from going outside its range.

Although what I have described is a preferred embodiment of my invention it is to be understood that various modifications and rearrangement of parts can be made without departing from the spirit and scope of my invention. Thus, another potentiometer similar to 16 of FIG. 1 but having a linear element may be driven from the same shaft and gear train 23 as is the pot 16. A voltage or resistance output from the instrument can thus be obtained that is linearly proportional to temperature to provide a retransmitting output or second channel signal which could be used for control, recording, or other purposes as an analogue output.

What I claim is:

1. A digital reading instrument for measuring a parameter, including, in combination:

means whose resistance is variable as a function of said parameter in a non-linear manner;
a rebalancing bridge network including as arms thereof said aforementioned means and a linear characteristic potentiometer, said potentiometer having a movable element;
a source of power connected to said network;
means for sensing a first voltage across said first mentioned means;
means for sensing a second voltage across an end of said potentiometer and said moving element;
means connected to receive and compare said first voltage with said second voltage to create a rebalancing signal;
a servo-display system including amplifier means interconnected to receive said rebalancing signal and impress an amplified rebalancing signal upon a servo motor to rotate same, said motor being connected to operate said movable element so as to rebalance said bridge network and simultaneously being connected to operate a digital display calibrated in values of said parameter;
a portion of said rebalancing bridge network including said first mentioned means exhibiting a voltage vs. parameter characteristic; and
a function shaping network connected to said potentiometer for matching the potentiometer output to said voltage vs. parameter characteristic, said function shaping network comprising a plurality of fixed resistors connected across predetermined portions of said potentiometer, whereby a close approximation is attached in output characteristic of said potentiometer to the characteristic exhibited by said first named means as its resistance varies as a function of said parameter.

2. A digital reading instrument for measuring a parameter, including, in combination:

means whose resistance is variable as a function of said parameter in a non-linear manner;
a rebalancing bridge network including as arms thereof said aforementioned means and a linear characteristic potentiometer, said potentiometer having a movable element;
a source of power connected to said network;
means for sensing a first voltage across said first mentioned means;
means for sensing a second voltage across an end of said potentiometer and said moving element;
means connected to receive and compare said first voltage with said second voltage to create a rebalancing signal;
a servo-display system including amplifier means interconnected to receive said rebalancing signal and impress an amplified rebalancing signal upon a servo motor to rotate same, said motor being connected to operate said movable element so as to rebalance said bridge network and simultaneously being connected to operate a digital display calibrated in values of said parameter;
a portion of said rebalancing bridge network including said first mentioned means exhibiting a voltage vs. parameter characteristic;
a function shaping network connected to said linear characteristic potentiometer for matching the potentiometer output to said voltage vs. parameter characteristic whereby a close approximation is attained in output characteristic of said potentiometer to the characteristic exhibited by said first named means as its resistance varies as a function of said parameter;
and a fixed resistor connected in series between said source of power and said network to serve as a voltage divider with respect to the composite resistance of said network, said resistor being so selected as to minimize variations in said rebalancing signal with respect to incremental changes of values of said parameter over the range of said parameter.

3. The digital reading instrument of claim 2 wherein said function shaping network comprises a plurality of fixed resistors connected across predetermined portions of said potentiometer.

4. The digital reading instrument of claim 2 including a second potentiometer interconnected so as to be operated by the said servo motor to provide an analogue output means which varies as a function of the measured value of said parameter.

5. The digital reading instrument of claim 2 including a second potentiometer interconnected so as to be operated by the said servo motor to provide an analogue output means which varies as a function of the measured value of said parameter.

References Cited

UNITED STATES PATENTS

| | | | |
|---|---|---|---|
| 2,745,996 | 5/1956 | Sylvander | 323—75 XR |
| 2,872,641 | 2/1959 | Hudson et al. | 324—99 XR |
| 2,989,256 | 6/1961 | Lee | 324—62 XR |
| 3,109,137 | 10/1963 | Huddleston | 324—65 XR |

RUDOLPH V. ROLINEC, *Primary Examiner.*

E. E. KUBASIEWICZ, *Assistant Examiner.*

U.S. Cl. X.R.

73—362; 324—99